(12) United States Patent
Warneke et al.

(10) Patent No.: US 11,054,147 B1
(45) Date of Patent: *Jul. 6, 2021

(54) FLOOR HEATING SYSTEM INCLUDING MEMBRANES THAT ARE CONFIGURED TO BE JOINED TOGETHER TO HOUSE A HEATING CABLE, AND FLOORING UNDERLAYMENT INCLUDING SUCH MEMBRANES

(71) Applicant: MP Global Products, L.L.C., Norfolk, NE (US)

(72) Inventors: Chase Warneke, Pierce, NE (US); Alan B. Collison, Pierce, NE (US); Reid Borgman, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,610

(22) Filed: Nov. 9, 2020

Related U.S. Application Data

(63) Continuation of application No. 16/885,782, filed on May 28, 2020.

(51) Int. Cl.
*F24D 3/14* (2006.01)
*E04F 15/18* (2006.01)

(52) U.S. Cl.
CPC ............ *F24D 3/142* (2013.01); *E04F 15/182* (2013.01); *E04F 15/185* (2013.01)

(58) Field of Classification Search
CPC . F24D 3/12; F24D 3/141; F24D 3/144; F24D 13/02; F24D 13/024;
(Continued)

(56) References Cited

U.S. PATENT DOCUMENTS

| 2,956,785 A | * | 10/1960 | Richl | ..................... F24D 5/10 165/56 |
| 3,419,457 A | | 12/1968 | Harold | |

(Continued)

FOREIGN PATENT DOCUMENTS

| DE | 1986165 U | 5/1968 |
| DE | 3317131 A1 | 11/1984 |

(Continued)

OTHER PUBLICATIONS

Schluter DITRA-HEAT Electric floor warming system with integrated uncoupling technology brochure, Oct. 2018, Schluter Systems L.P., 8 pages.

(Continued)

*Primary Examiner* — Daniel E. Namay
(74) *Attorney, Agent, or Firm* — Harness, Dickey & Pierce, P.L.C.

(57) ABSTRACT

A flooring underlayment includes a base membrane and a cover membrane. The base membrane is configured to be installed between a subfloor and floor tiles to allow movement of the floor tiles relative to the subfloor. The base membrane includes a base layer and studs projecting from the base layer. The studs have free ends that define pockets therein. The cover membrane is configured to be coupled to the base membrane to form a flat surface for supporting the floor tiles. The cover membrane includes a cover layer and studs projecting from the cover layer. The studs on the cover membrane are configured to fit within the pockets in the base membrane to couple the cover membrane to the base membrane.

21 Claims, 11 Drawing Sheets

(58) Field of Classification Search
CPC ........ F24D 19/0213; E04B 5/48; E04F 15/18;
H05B 3/28; Y02B 30/26
USPC ...... 237/8 A, 56, 59, 69; 52/220.1; 138/177;
165/47, 48.1, 49, 50, 53, 56; 219/213;
432/31
IPC ......... F24D 3/02,3/12, 3/14, 3/16, 13/02; E04B
5/48
See application file for complete search history.

(56) References Cited

U.S. PATENT DOCUMENTS

| | | | |
|---|---|---|---|
| 3,495,367 A * | 2/1970 | Kobayashi | E04C 2/06 |
| | | | 52/223.6 |
| 3,597,891 A * | 8/1971 | Martin | E04C 2/3405 |
| | | | 52/145 |
| 3,757,481 A * | 9/1973 | Skinner | E04F 15/02411 |
| | | | 52/265 |
| 4,326,366 A | 4/1982 | Werner | |
| 5,042,569 A | 8/1991 | Siegmund | |
| 5,082,712 A | 1/1992 | Starp | |
| 5,862,854 A * | 1/1999 | Gary | F28F 1/14 |
| | | | 165/171 |
| 6,094,878 A * | 8/2000 | Schluter | E04D 11/00 |
| | | | 52/323 |
| 6,220,523 B1 | 4/2001 | Fiedrich | |
| 6,434,901 B1 | 8/2002 | Schluter | |
| D541,396 S * | 4/2007 | Fawcett | D23/314 |
| D587,358 S * | 2/2009 | Stephan | D23/314 |
| 8,002,241 B1 * | 8/2011 | Shaw | B60P 3/36 |
| | | | 254/88 |
| 8,176,694 B2 | 5/2012 | Batori | |
| 8,950,141 B2 | 2/2015 | Schluter et al. | |
| 8,955,278 B1 | 2/2015 | Mills | |
| 9,188,348 B2 | 11/2015 | Larson | |
| D773,697 S * | 12/2016 | Amend | D25/157 |
| 9,625,163 B2 | 4/2017 | Larson | |
| 9,719,265 B2 | 8/2017 | Bordin et al. | |
| D806,912 S * | 1/2018 | Bordin | D25/158 |
| 9,890,959 B2 * | 2/2018 | Houle | E04F 15/107 |
| 10,006,644 B2 * | 6/2018 | Larson | E04F 15/182 |
| 10,107,505 B2 | 10/2018 | Larson | |
| 2007/0056233 A1 * | 3/2007 | Kang | E04F 15/203 |
| | | | 52/220.1 |
| 2008/0017725 A1 | 1/2008 | Backman | |
| 2008/0276557 A1 | 11/2008 | Rapaz | |
| 2008/0290503 A1 * | 11/2008 | Karavakis | H01L 23/3737 |
| | | | 257/713 |
| 2008/0290504 A1 * | 11/2008 | Karavakis | H01L 23/3737 |
| | | | 257/713 |
| 2009/0026192 A1 | 1/2009 | Fuhrman | |
| 2009/0217605 A1 | 9/2009 | Batori | |
| 2009/0230113 A1 | 9/2009 | Batori | |
| 2011/0047907 A1 | 3/2011 | Smolka et al. | |
| 2014/0069039 A1 | 3/2014 | Schluter et al. | |
| 2016/0010327 A1 * | 1/2016 | Larson | F16L 3/02 |
| | | | 52/220.1 |
| 2016/0192443 A1 * | 6/2016 | Schluter | H02G 9/02 |
| | | | 174/97 |
| 2018/0223543 A1 * | 8/2018 | Faotto | B32B 5/18 |
| 2019/0100925 A1 | 4/2019 | Pucilowski | |
| 2019/0226686 A1 | 7/2019 | White et al. | |

FOREIGN PATENT DOCUMENTS

| | | | |
|---|---|---|---|
| DE | 3543688 A1 | 1/1987 | |
| DE | 9114591 U1 * | 3/1993 | ............ F24D 3/142 |
| DE | 29609497 U1 | 8/1996 | |
| DE | 19936801 C1 | 8/2000 | |
| DE | 19912922 C1 | 1/2001 | |
| DE | 10040643 C1 | 11/2001 | |
| DE | 102006004626 A1 | 8/2007 | |
| EP | 133556 A2 | 2/1985 | |
| EP | 368804 A1 * | 11/1989 | |
| EP | 367176 A2 | 5/1990 | |
| EP | 1338413 A1 * | 8/2003 | ............ B32B 27/32 |
| JP | H01139935 A | 6/1989 | |
| JP | 2001012067 A | 1/2001 | |
| WO | WO-8203099 A1 * | 9/1982 | ............ E04F 15/02 |
| WO | WO-2004111544 A1 | 12/2004 | |

OTHER PUBLICATIONS

Schluter DITRA-HEAT Electric floor warming system with integrated uncoupling technology pamphlet, Mar. 2020, Schluter Systems L.P. and affiliates, 10 pages.

* cited by examiner

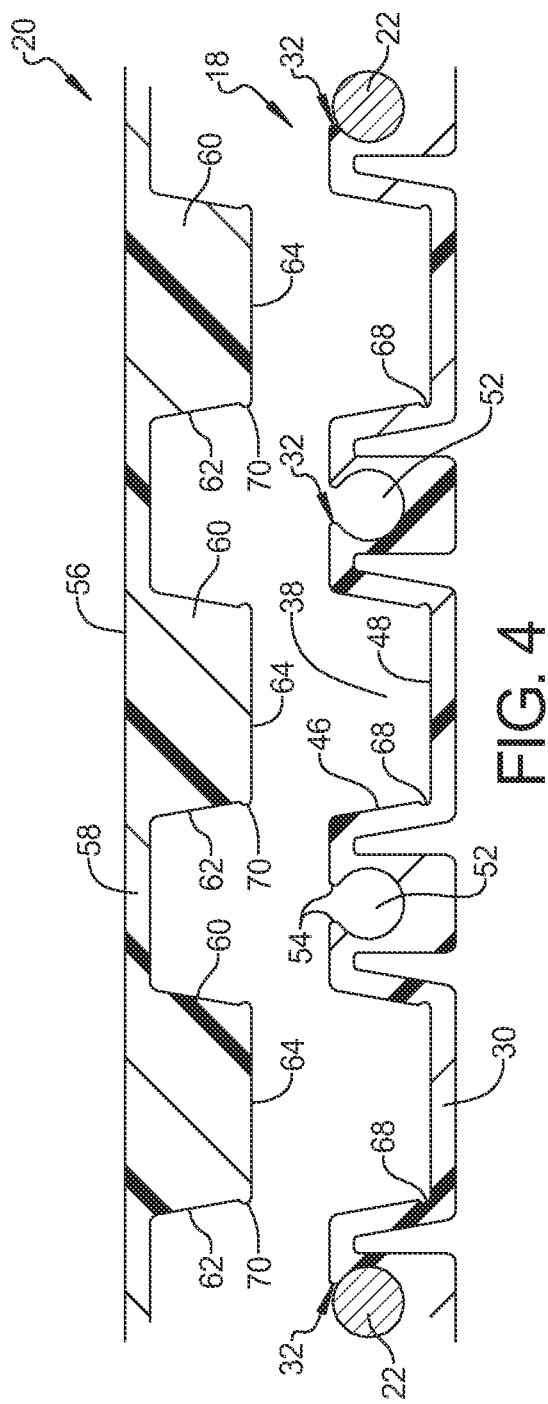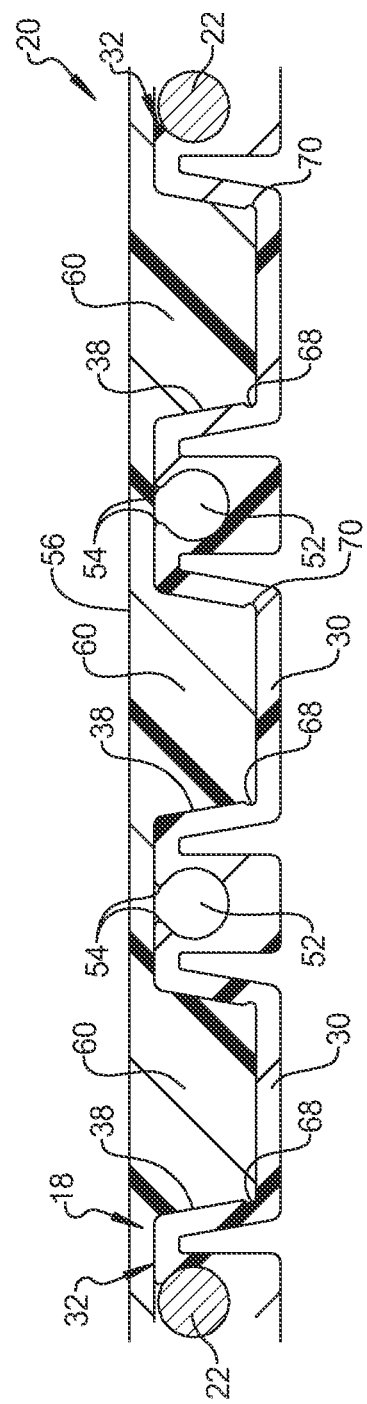

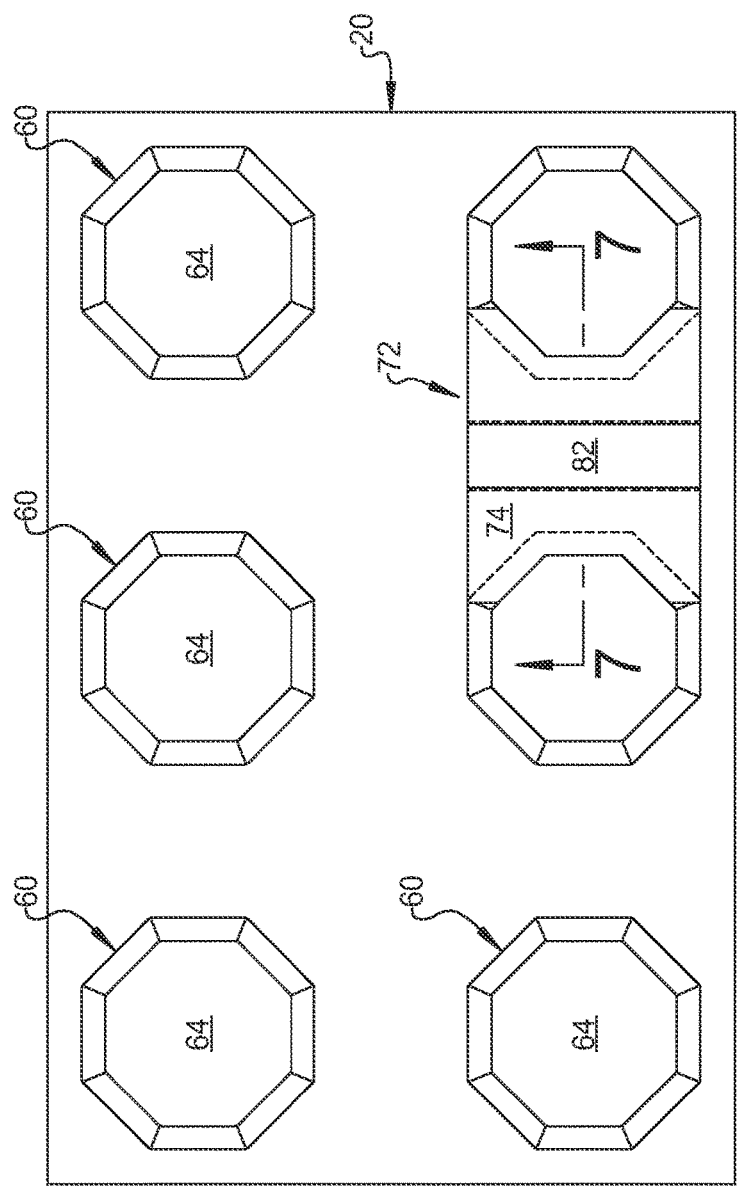
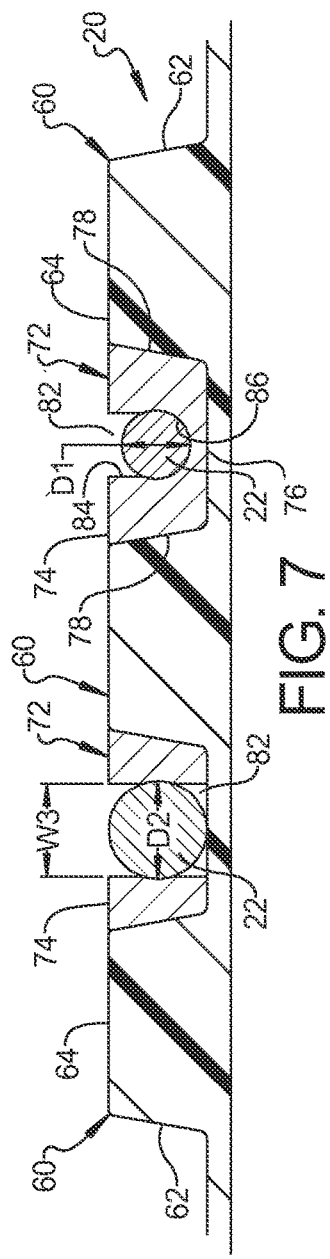
FIG. 6
FIG. 7

FLOOR HEATING SYSTEM INCLUDING MEMBRANES THAT ARE CONFIGURED TO BE JOINED TOGETHER TO HOUSE A HEATING CABLE, AND FLOORING UNDERLAYMENT INCLUDING SUCH MEMBRANES

CROSS-REFERENCE TO RELATED APPLICATIONS

The present disclosure is a continuation of U.S. patent application Ser. No. 16/885,782 filed on May 28, 2020. The entire disclosure of the application referenced above is incorporated herein by reference.

FIELD

The present disclosure relates to floor heating systems including membranes that are configured to be joined together to house a heating cable, and flooring underlayment including such membranes.

BACKGROUND

This section provides background information related to the present disclosure which is not necessarily prior art.

Floor heating systems are placed between a subfloor and a floor covering, such as a tile floor, to heat the floor covering to a desired temperature. Floor heating systems typically include a heating cable and an uncoupling membrane. The heating cable generates heat when electrical current is passed through the heating cable. The uncoupling membrane holds the heating cable in a desired routing pattern as the floor covering is installed over the heating cable. In addition, the uncoupling membrane uncouples the floor covering and the subfloor from one another to allow the floor covering and the subfloor to move in a horizontal plane relative to one another.

SUMMARY

An example of a flooring underlayment according to the present disclosure includes a base membrane and a cover membrane. The base membrane is configured to be installed between a subfloor and floor tiles to allow movement of the floor tiles relative to the subfloor. The base membrane includes a base layer and a plurality of studs projecting from the base layer. The plurality of studs have free ends that define pockets therein. The cover membrane is configured to be coupled to the base membrane to form a flat surface for supporting the floor tiles. The cover membrane includes a cover layer and a plurality of studs projecting from the cover layer. The plurality of studs on the cover membrane are configured to fit within the pockets in the plurality of studs on the base membrane to couple the cover membrane to the base membrane.

In one example, the plurality of studs on the cover membrane are configured to be secured within the pockets in the plurality of studs on the base membrane using a snap fit.

In one example, the base membrane and the cover membrane are made of at least one of a plastic and a rubber.

In one example, each stud in the plurality of studs on the base membrane has an outer side surface and a top surface, and each pocket in the plurality of studs has an inner side surface and a bottom surface. The inner side surface tapers outward from the bottom surface to the top surface.

In one example, each stud in the plurality of studs on the cover layer has an outer side surface and a bottom surface, and the outer side surface of each stud in the plurality of studs on the cover layer tapers inward from the cover layer to the bottom surface of the corresponding stud on the cover layer.

In one example, the inner side surface of each pocket in the plurality of studs on the base membrane tapers outward at a first angle, and the outer side surface on each stud in the plurality of studs on the cover membrane tapers inward at a second angle that is equal to the first angle.

In one example, each stud in the plurality of studs on the base membrane has an outer perimeter with a polygonal shape having N sides, where N is an integer greater than one.

In one example, each pocket in the plurality of studs on the base membrane has an inner perimeter with a first polygonal shape having N sides, where N is an integer greater than one.

In one example, each stud in the plurality of studs on the cover membrane has an outer perimeter with a second polygonal shape having P sides, where P is equal to N.

In one example, each pocket in the plurality of studs on the base membrane has a tapered inner surface, and each stud in the plurality of studs on the cover membrane has a tapered outer surface that matches the tapered inner surface.

In one example, each pocket in the plurality of studs on the base membrane has an inner perimeter with a first polygonal shape, and each stud in the plurality of studs on the cover membrane has an outer perimeter with a second polygonal shape that matches the first polygonal shape.

An example of a floor structure according to the present disclosure includes a subfloor, floor tiles, a base membrane, a heating cable, and a cover membrane. The base membrane is configured to be installed between the subfloor and the floor tiles to allow movement of the floor tiles relative to the subfloor. The base membrane includes a base layer and a plurality of studs projecting from the base layer. The plurality of studs have free ends that define pockets therein. The cover membrane is configured to be coupled to the base membrane to form a flat surface for supporting the floor tiles. The cover membrane includes a cover layer and a plurality of studs projecting from the cover layer. The plurality of studs on the cover membrane are configured to fit within the pockets in the plurality of studs on the base membrane to couple the cover membrane to the base membrane.

In one example, each pocket in the plurality of studs on the base membrane has a tapered inner surface, and each stud in the plurality of studs on the cover membrane has a tapered outer surface that matches the tapered inner surface.

In one example, each pocket in the plurality of studs on the base membrane has an inner perimeter with a first polygonal shape, and each stud in the plurality of studs on the cover membrane has an outer perimeter with a second polygonal shape that matches the first polygonal shape.

In one example, the floor structure is free of any heating cable.

An example method of installing a flooring underlayment between a subfloor and floor tiles according to the present disclosure includes placing a base membrane onto the subfloor. The base membrane includes a base layer and a plurality of studs projecting from the base layer. The plurality of studs define a plurality of pockets therein. The method further includes coupling a cover membrane to the base membrane by inserting a plurality of studs on the cover membrane into the plurality of pockets in the base membrane to form a flat top surface, and installing the floor tiles on the flat top surface formed by the cover membrane.

In one example, the method includes securing the plurality of studs on the cover membrane within the plurality of pockets in the base membrane using a snap fit.

In one example, the method includes applying a first layer of thinset between the subfloor and the base membrane.

In one example, the method includes applying a second layer of thinset between the cover membrane and the floor tiles.

In one example, the method includes installing the floor tiles without applying thinset directly to the base membrane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a section view a heating cable having a circular cross-section positioned within the base membrane while the cover membrane is disassembled from the base membrane;

FIG. 5 is a section view of the heating cable of FIG. 4 positioned within the base membrane while the cover membrane is disassembled from the base membrane;

FIG. 6 is a planar view of the cover membrane with a conversion clip installed between studs on the cover membrane, and the heating cable of FIG. 4 positioned within the conversion clip;

FIG. 7 is a section view of the floor heating system taken along a line 7-7 shown in FIG. 6, the section view illustrating two embodiments of the conversion clip;

In the drawings, reference numbers may be reused to identify similar and/or identical elements.

DETAILED DESCRIPTION

Figure 1:
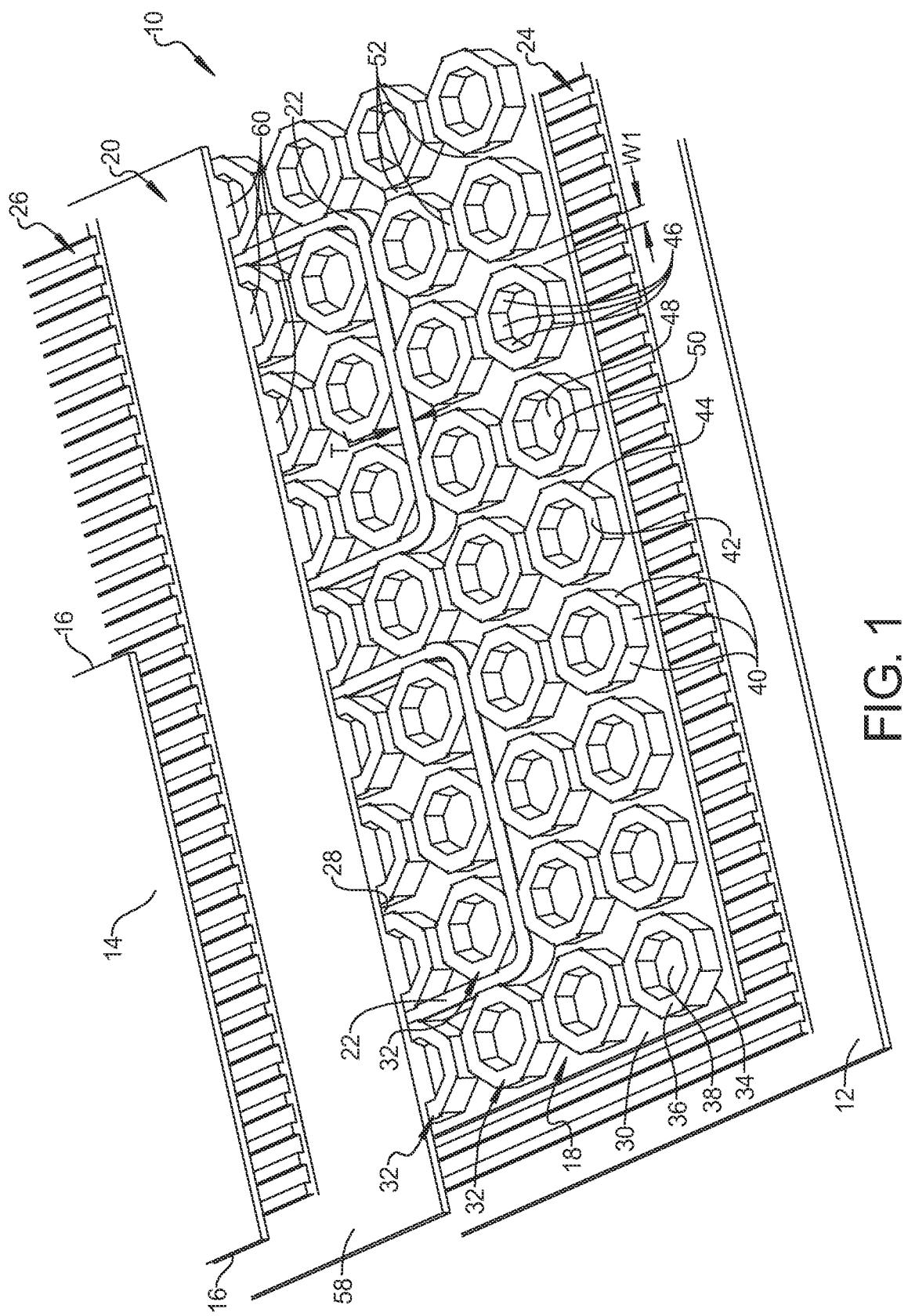
FIG. 1 is a sectioned perspective view of a floor heating system according to the principles of the present disclosure, the floor heating system including a base membrane and a cover membrane encapsulating a heating cable having a rectangular cross-section.

To install a typical floor heating system, an uncoupling membrane is secured to a subfloor using a first layer of thinset, a heating cable is embedded in the uncoupling membrane along a desired routing pattern, and a second layer of thinset is applied directly to the uncoupling membrane and the heating cable to encapsulate the heating cable. The second layer of thinset is leveled to form a flat surface, allowed to cure for 24 hours, and then floor tiles are installed on the flat surface formed by the second layer of thinset and secured to the second layer of thinset using a third layer of thinset. The third layer of thinset is allowed to cure for 24 hours, and then grout is inserted in spaces between floor tiles to form tile joints. Excess grout is then removed, and the tile floor is cleaned for use.

In contrast, a floor heating system according to the present disclosure includes a second uncoupling membrane that is used in place of the second layer of thinset to encapsulate the heating cable and to form a flat surface on which the floor tiles are installed. Thus, a floor heating system according to the present disclosure avoids the cost, time, and effort associated with applying the second layer of thinset, leveling the second layer of thinset, and allowing the second layer of thinset to cure. In addition, a floor heating system according to the present disclosure reduces the cost, time, and effort associated with repairing damage to the heating cable, as discussed in more detail below. Further, the second uncoupling membrane is significantly lighter than the second layer of thinset, and therefore the weight of a floor heating system according to the present disclosure is significantly (e.g., approximately 30%) less than the weight of a typical floor heating system. In the discussion that follows, the uncoupling membrane in which the heating cable is embedded is referred to as a base membrane, the second uncoupling membrane is referred to as a cover membrane, and the layer of thinset used to secure the floor tiles is referred to as the second layer instead of the third layer since the second layer of thinset discussed above is omitted.

The base and cover membranes uncouple the subfloor and the floor tiles from one another to allow the subfloor and the floor tiles to move relative to one another in a horizontal plane. The base and cover membranes may be used to uncouple the subfloor and the floor tiles from one another even when a heating cable is not embedded in the base membrane or encapsulated between the base and cover membranes. For example, the base and cover membranes may be included in or comprise a flooring underlayment that uncouples a subfloor and floor tiles from one another, but does not include a heating cable and is not operable to heat the floor tiles.

A flooring underlayment may include a single uncoupling membrane that uncouples the subfloor and the floor tiles from one another. To install such a flooring underlayment, the uncoupling membrane is secured to the subfloor using a first layer of thinset, and a second layer of thinset is applied directly to the uncoupling membrane. The second layer of thinset is leveled to form a flat surface, allowed to cure for 24 hours, and then floor tiles are installed on the flat surface formed by the second layer of thinset and secured to the second layer of thinset using a third layer of thinset. The third layer of thinset is allowed to cure for 24 hours, and then grout is inserted in spaces between floor tiles to form tile joints. Excess grout is then removed, and the tile floor is cleaned for use.

In contrast, a flooring underlayment according to the present disclosure includes both the uncoupling membrane that is secured to the subfloor (the base membrane) and second uncoupling membrane (the cover membrane). The second uncoupling membrane is used in place of the second layer of thinset to form a flat surface on which the floor tiles are installed. Thus, a flooring underlayment according to the present disclosure avoids the cost, time, and effort associated with applying the second layer of thinset, leveling the second layer of thinset, and allowing the second layer of thinset to cure. In addition, a flooring underlayment according to the present disclosure reduces the cost, time, and effort associated with replacing the floor tiles since the floor tiles may be removed by breaking out only one or some of the floor tiles individually to gain access to the second uncoupling membrane, and then simply pulling up the second uncoupling membrane to remove the rest of the floor tiles. Further, the second uncoupling membrane is significantly lighter than the second layer of thinset, and therefore the weight of a flooring underlayment according to the present disclosure is significantly (e.g., approximately 30%) less than a flooring underlayment that includes a single uncoupling membrane.

Referring now to FIGS. 1-3, 8, and 9, a floor heating system 10 is configured to be installed between a subfloor 12 and a plurality of floor tiles 14 and is operable to heat the floor tiles 14. The subfloor 12 may be any type of subfloor that is suitable for use with floor tile such as plywood or oriented stranded board (OSB). The floor tiles 14 may be made of ceramic, porcelain, or stone. The spaces between the floor tiles 14 are filled with grout to form joints 16 between the floor tiles 14.

The floor heating system 10 includes a base membrane 18, a cover membrane 20, and a heating cable 22. In various implementations, the heating cable 22 may be omitted from the floor heating system 10, in which case the floor heating system 10 may be referred to as a flooring underlayment 10. The floor heating system or flooring underlayment 10, the subfloor 12, and the floor tiles 14 may be collectively referred to as a floor structure. A first layer 24 of thinset is applied between the subfloor 12 and the base membrane 18 to provide a level surface on which the base membrane 18 may be installed and/or to adhere the base membrane 18 to the subfloor 12. A second layer 26 of thinset is applied between the cover membrane 20 and the floor tiles 14 to provide a level surface on which the floor tiles 14 may be installed and/or to adhere the floor tiles 14 to the cover membrane 20.

The base and cover membranes 18 and 20 uncouple the subfloor 12 and the floor tiles 14 from one another to allow movement of the floor tiles 14 relative to the subfloor 12 in a horizontal plane and to allow movement of the subfloor 12 relative to the floor tiles 14 in a horizontal plane. In this regard, the base and cover membranes 18 and 20 may be referred to as uncoupling membranes. By uncoupling the subfloor 12 and the floor tiles 14 from one another and allowing such movement to occur, the base and cover membranes 18 and 20 reduce stress in the floor tiles 14 and the joints 16 therebetween, which inhibits cracking of the floor tiles 14 and the joints 16. The base and cover membranes 18 and 20 may be made (e.g., hard pressed, molded) from a flexible material such as plastic (polyethylene or polypropylene) or rubber.

The base membrane 18 also creates an air space 28 between the subfloor 12 and the floor tiles 14 in which the heating cable 22 may be installed, and holds the heating cable 22 in place once the heating cable 22 is installed in the air space 28. The air space 28 may provide insulation by inhibiting heat transfer between the subfloor 12 and the floor tiles 14. The base membrane 18 includes a base layer 30 and a plurality of studs 32 that project upward from the base layer 30. The base layer 30 and the studs 32 may be formed together as a unitary body. The base layer 30 is a flat sheet of material. Each stud 32 has a right octagonal prism shape with a first end 34 attached to the base layer 30, a second, free end 36 opposite of the first end 34, and a depression or pocket 38 extending into the free end 36.

In addition, each stud 32 has outer side surfaces 40, a top surface 42, and an outer perimeter 44, and each pocket 38 has inner side surfaces 46, a bottom surface 48, and an inner perimeter 50. In the example shown, the outer perimeter 44 of each stud 32 has an octagonal shape with eight sides, and the inner perimeter 50 of each pocket 38 has an octagonal shape with eight sides. In addition, the inner side surfaces 46 of each pocket 38 taper outward at a first angle A1 from the bottom surface 48 to the top surface 42. In other examples, the outer perimeter 44 of each stud 32 and/or the inner perimeter 50 of each pocket 38 may have a polygonal shape with a number of sides other than eight, and/or the inner side surfaces 46 of each pocket 38 may not be tapered. In one example, the outer perimeter 44 of each stud 32 may have a polygonal shape with four, five, or six sides, in which the overall or three-dimensional shape of each stud 32 may be a right rectangular prism, a right pentagonal prism, or right hexagonal prism, respectively. In another example, the outer perimeter 44 of each stud 32 may have a circular shape, in which case the overall or three-dimensional shape of each stud 32 may be a right cylinder.

The heating cable 22 is operable to generate heat when electrical current is passed through the heating cable 22. The heating cable 22 is positioned between adjacent ones of the studs 32 at locations along a desired routing pattern of the heating cable 22. The desired routing pattern of the heating cable 22 may ensure that the floor tiles 14 are heated to a desired temperature within a desired response time after electrical current is first passed through the heating cable 22, while minimizing the length of the heating cable 22 that is required to do so. The heating cable 22 may be a standard heating cable such as a metal (e.g., aluminum or copper) wire housed in an outer sheath made of plastic or rubber. Alternatively, the heating cable 22 may be a fiber optic cable.

The studs 32 are arranged in a matrix on the base layer 30, and adjacent ones of the studs 32 are spaced apart from one another by a gap 52. The gap 52 has a width W1 that is approximately equal to a thickness T of the heating cable 22. In addition, the cross-sectional shape of the gap 52 matches the cross-sectional shape of the heating cable 22 so that the heating cable 22 is held within the gap 52 using a snug or snap fit. Further, in the example shown, the studs 32 include lips 54 that extends over the gap 52 to hold the heating cable 22 in the gap 52. The lips 54 flex to allow the heating cable 22 to be inserted into the gap 52, and then return to their original state (shown) to retain the heating cable 22 in the gap 52.

Figure 2:
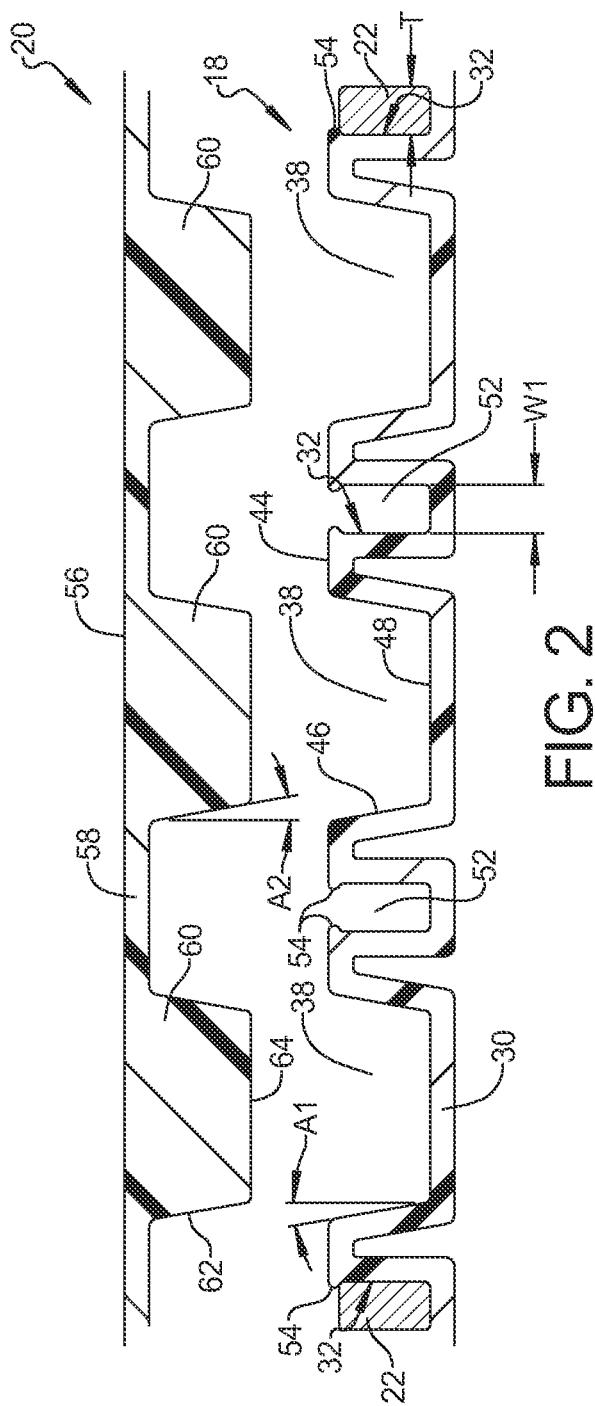
FIG. 2 is a section view of the heating cable positioned within the base membrane while the cover membrane is disassembled from the base membrane.
Figure 3:
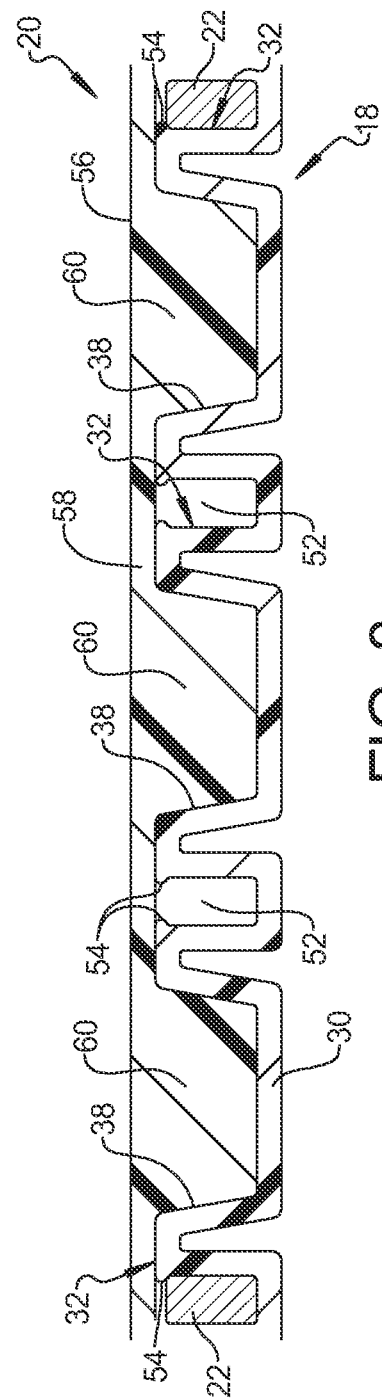
FIG. 3 is a section view of the heating cable positioned within the base membrane while the cover membrane is assembled to the base membrane to encapsulate the heating cable.
Figure 8:
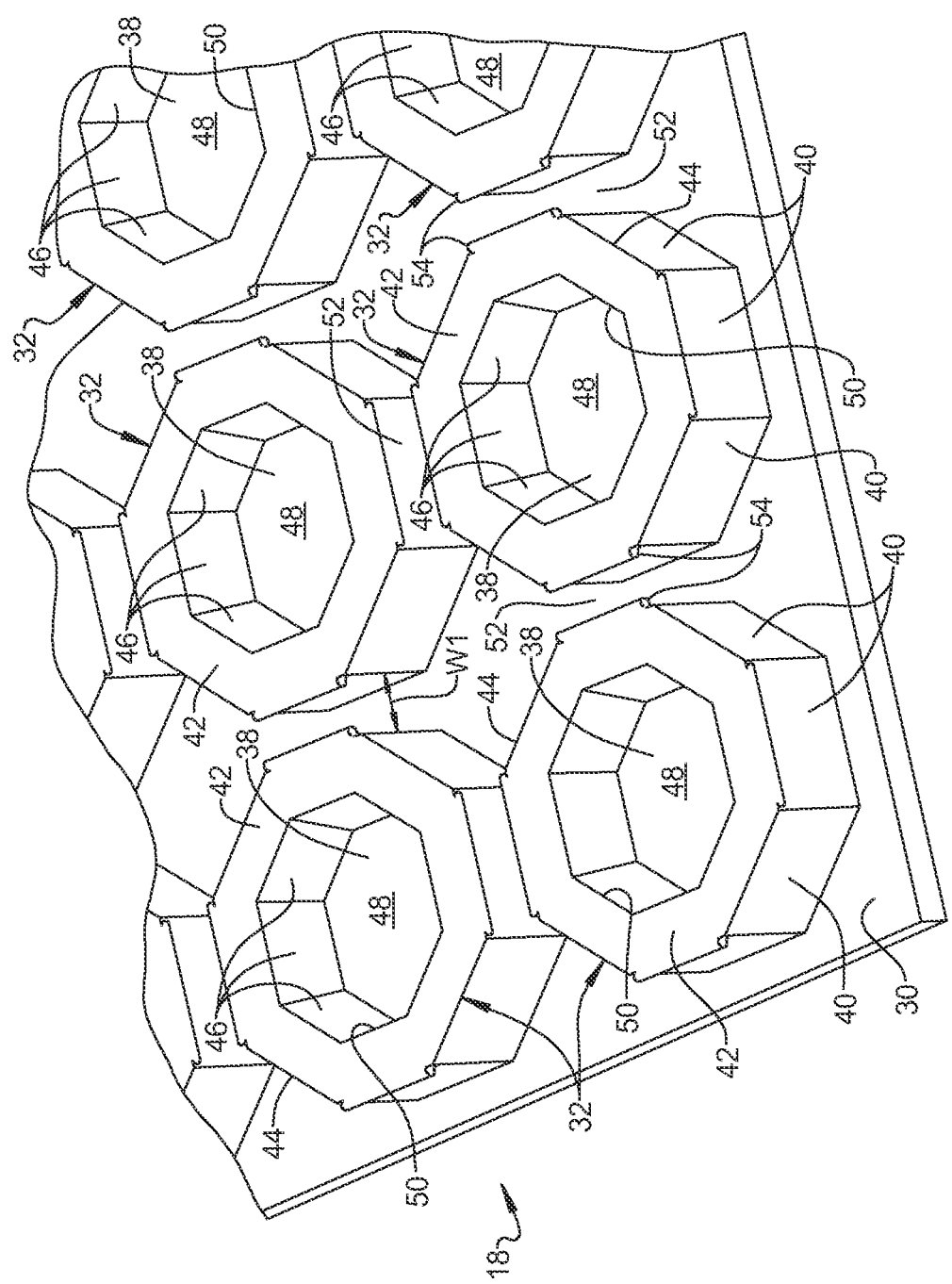
FIG. 8 is a perspective view of the base membrane.
Figure 9:
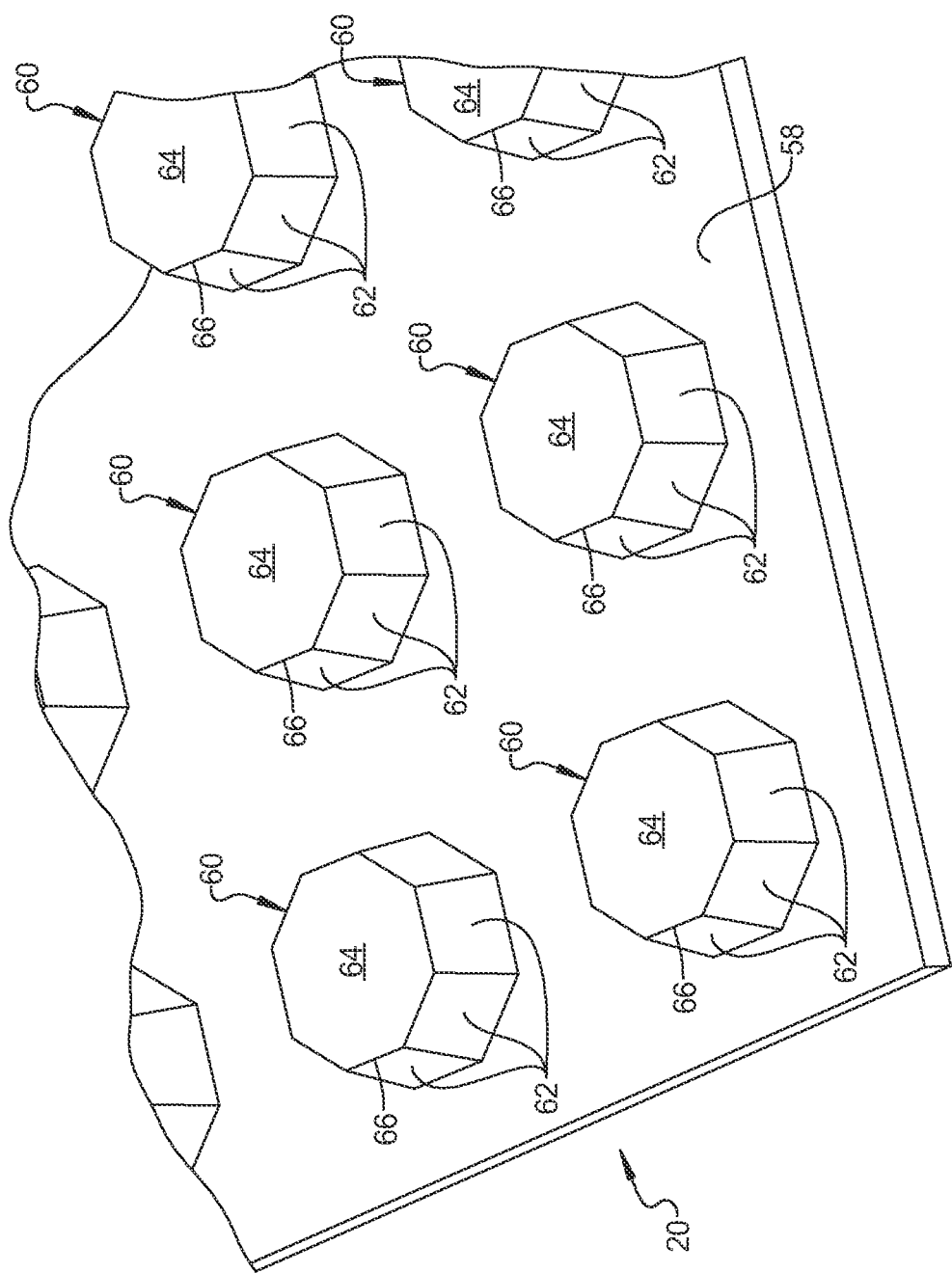
FIG. 9 is a perspective view of the cover membrane.

In the example shown in FIGS. 1-3, the heating cable 22 has a rectangular cross-section, and therefore the gaps 52 between adjacent studs 32 on the base membrane 18 have a rectangular cross section. In other implementations, the heating cable 22 may have a cross-sectional shape other than rectangular, and the gaps 52 between adjacent studs 32 on the base membrane 18 may have the same cross sectional shape. For example, as shown in FIGS. 4 and 5, the heating cable 22 may have a circular cross-sectional shape, and therefore the gaps 52 between adjacent studs 32 on the base membrane 18 also have a circular cross-section.

Referring again to FIGS. 1-3, 8, and 9, the cover membrane 20 is configured to be coupled to the base membrane 18 to encapsulate the heating cable 22 between the base and cover membranes 18 and 20. In addition, the cover membrane 20 is configured to form a flat top surface 56 on which the floor tiles 14 may be installed regardless of whether the heating cable 22 is included in the floor heating system 10 (or the flooring underlayment 10). Thus, the cover membrane 20 may be used in place of applying thinset directly to the base membrane 18 to encapsulate the heating cable 22 and/or to form a flat top surface on which the floor tiles 14 may be installed. Using the cover membrane 20 in place of thinset may reduce the weight of the floor heating system or flooring underlayment by a significant amount (e.g., up to approximately 30 percent). In addition, using the cover membrane 20 in place of thinset reduces the amount of time and effort required to install the floor heating system or flooring underlayment 10, as there is no need to mix thinset, apply it to the base membrane 18, and wait 24 hours for it to harden.

Further, using the cover membrane 20 in place of thinset makes it quicker, easier, and less costly to repair damage to the heating cable 22. To repair damage to the heating cable 22 in a floor heating system that uses thinset to encapsulate the heating cable 22, one must break out the floor tiles 14 and the thinset beneath the tiles 14, chip away the thinset encapsulating the heating cable 22 while trying not to further damage the heating cable 22, and fix the heating cable 22. Then, the base membrane 18 must be replaced, thinset must be reapplied to the base membrane 18 to encapsulate the heating cable 22, and the floor tiles 14 must be replaced. In contrast, to repair damage to the heating cable 22 in the floor heating system 10, one may simply dermal out the grout in the joints 16, pop the floor tiles 14 loose from the cover membrane 20, cut the cover membrane 20 and decouple it from the base membrane 18, fix the heating cable 22, and reinstall/reuse all parts. Thus, the floor heating system 10 avoids the need to reapply thinset to the base membrane 18 to encapsulate the heating cable 22 before proceeding with the repair, and the floor heating system 10 reduces the number of parts that must be replaced in the repair.

Moreover, regardless of whether the heating cable 22 is included in the floor heating system 10 (or the flooring underlayment 10), using the cover membrane 20 in place of thinset makes it quicker, easier, and less costly to replace the floor tiles 14. To replace the floor tiles 14 in a floor structure that uses thinset to form a flat surface on which the floor tiles 14 are installed, one must break out all the floor tiles 14 individually (or one at a time). In contrast, to replace the floor tiles 14 in a floor structure that the cover membrane 20, one must only break out only one or some of the floor tiles 14 individually to gain access to the cover membrane 20, and the rest of the floor tiles 14 may be removed by simply pulling up on the cover membrane 20.

The cover membrane 20 includes a cover layer 58 and a plurality of studs 60 that project downward from the cover layer 58. The cover layer 58 and the studs 60 may be formed together as a unitary body. The cover layer 58 is a flat sheet of material. The studs 60 on the cover membrane 20 are configured to fit within the pockets 38 in the studs 32 on the base membrane 18 to couple the cover membrane 20 to the base membrane 18.

The overall or three-dimensional shape of each stud 60 on the cover membrane 20 may match the overall or three-dimensional shape of each pocket 38 in the base membrane 18. In addition, the dimensions of each stud 60 on the cover membrane 20 may be equal to, or slightly greater than, the dimensions of each pocket 38 in the base membrane 18 to yield a snug or snap fit between the studs 60 and the pockets 38. The studs 60 are arranged in a matrix on the cover layer 58 and are spaced apart from one another in a horizontal plane to enable a plurality (e.g., all) of the studs 60 to be positioned within corresponding ones of the pockets 38 in the base membrane 18 at the same time.

In the example shown, each stud 60 has a right octagonal prism shape. In addition, each stud 60 has outer side surfaces 62, a bottom surface 64, and an outer perimeter 66. In the example shown, the outer perimeter 66 of each stud 60 has an octagonal shape with eight sides, and the outer side surfaces 62 of each stud 60 taper inward at a second angle A2 from the cover layer 58 to the bottom surface 64. In other examples, the outer perimeter 66 of each stud 60 may have a polygonal shape with a number of sides other than eight, and/or the outer side surfaces 62 of each stud 60 may not be tapered. In one example, the outer perimeter 66 of each stud 60 may have a polygonal shape with four, five, or six sides, in which the overall or three-dimensional shape of each stud 60 may be a right rectangular prism, a right pentagonal prism, or right hexagonal prism, respectively. In another example, the outer perimeter 66 of each stud 60 may have a circular shape, in which case the overall or three-dimensional shape of each stud 60 may be a right cylinder.

The outer side surfaces 62 of each stud 60 on the cover membrane 20 may match the inner side surfaces 46 of each pocket 38 in the base membrane 18. For example, the second angle A2 at which the outer side surfaces 62 of each stud 60 taper inward may be equal to the first angle A1 at which the inner side surfaces 46 of each pocket 38 taper outward. In addition, the outer perimeter 66 of each stud 60 on the cover membrane 20 may match the inner perimeter 50 of each pocket 38 in the base membrane 18. For example, the outer perimeter 66 of each stud 60 on the cover membrane 20 may have the same shape and the same number of sides as the inner perimeter 50 of each pocket 38 in the base membrane 18.

In addition to or instead of sizing and shaping the pockets 38 in the base membrane 18 and the studs 60 on the cover membrane 20 to yield a snug or snap fit therebetween, a detent mechanism may be used to retain the studs 60 in the pockets 38. For example, as shown in FIGS. 4 and 5, the base membrane 18 may define a groove 68 that extends around the inner perimeter 50 of each pocket 38 near the bottom surface 48 thereof, and each stud 60 may include a lip 70 that extends around the outer perimeter 66 of each stud 60 near the bottom surface 64 thereof. The lips 70 on the studs 60 of the cover membrane 20 may engage the grooves 68 in the pockets 38 of the base membrane 18 to couple the cover membrane 20 to the base membrane 18 using a snap fit.

Figure 10:
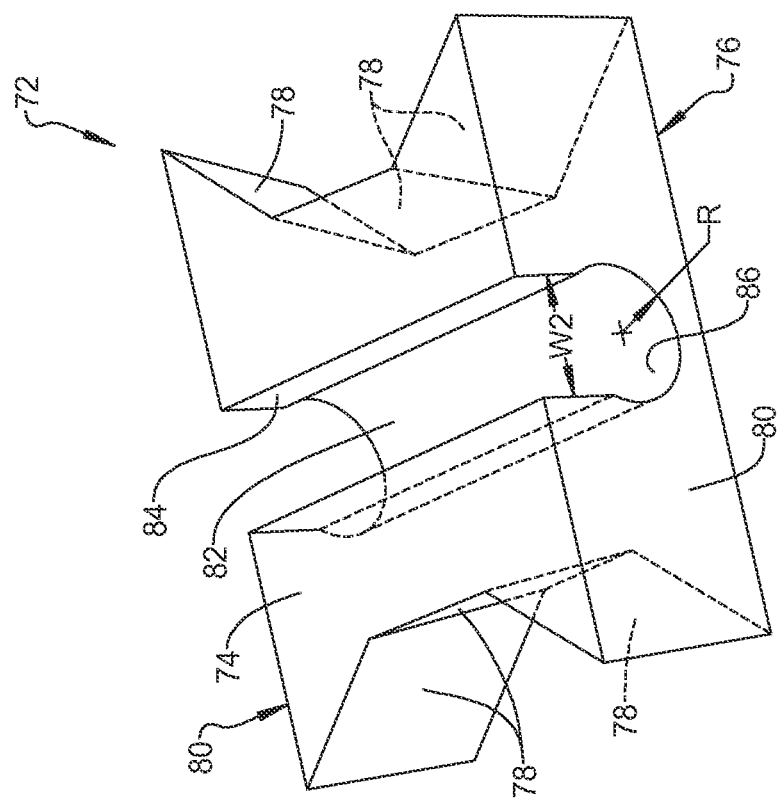
FIG. 10 is a perspective view of the conversion clip.

Referring now to FIGS. 6, 7, and 10, the cover membrane 20 may be fitted with a conversion clip 72 to convert the cover membrane 20 into a base membrane when, for example, it is not desirable to encapsulate the heating cable 22 using the cover membrane 20. Assuming that the area of the cover membrane 20 is equal to the area of the base membrane 18, converting the cover membrane 20 into a base membrane and placing the cover membrane 20 alongside the base membrane 18 doubles the area of the uncoupling membrane. The conversion clip 72 is configured to be positioned between adjacent ones of the studs 60 on the cover membrane 20 to hold the heating cable 22 in place. Although FIG. 6 only shows one of the conversion clip 72, the conversion clip 72 may be installed at multiple locations along a desired routing pattern of the heating cable 22 through the cover membrane 20.

The conversion clip 72 has a top surface 74, a bottom surface 76, opposite side surfaces 78, opposite end surfaces 80, and a channel 82 that extends into the top surface 74 and through the end surfaces 80. The side surfaces 78 are configured to conform to the outer side surfaces 40 of adjacent ones of the studs 60 on the cover membrane 20. The channel 82 is configured to conform to the heating cable 22.

In the example shown on the right in FIGS. 6 and 7 and shown in FIG. 10, the channel 82 includes a first portion 84 having a rectangular cross-section and a second portion 86 having a circular cross-section. The first portion 84 of the channel 82 has a width W2 that is slightly less than a diameter D1 of the heating cable 22. The second portion 86 of the channel 82 has a radius R that is approximately equal to one-half of the diameter D1 of the heating cable 22. Thus, the heating cable 22 may be compressed as the heating cable 22 is inserted through the first portion 84 of the channel 82, and then the heating cable 22 may return to its original, uncompressed state once the heating cable 22 is in the second portion 86 of the channel 82. In this manner, the conversion clip 72 may retain the heating cable 22 using a snap fit.

In the example shown on the left in FIG. 7, the heating cable 22 has a diameter D2 that is greater than the diameter D1, and the entire channel 82 has a rectangular cross-section with a width W3 that is equal to or slightly less than the diameter D2. Thus, the heating cable 22 may be compressed as the heating cable 22 is inserted into the channel 82, and the heating cable 22 may remain compressed until the heating cable 22 is withdrawn from the channel 82. In this manner, the conversion clip 72 may retain the heating cable 22 using a snug fit.

Figure 11:
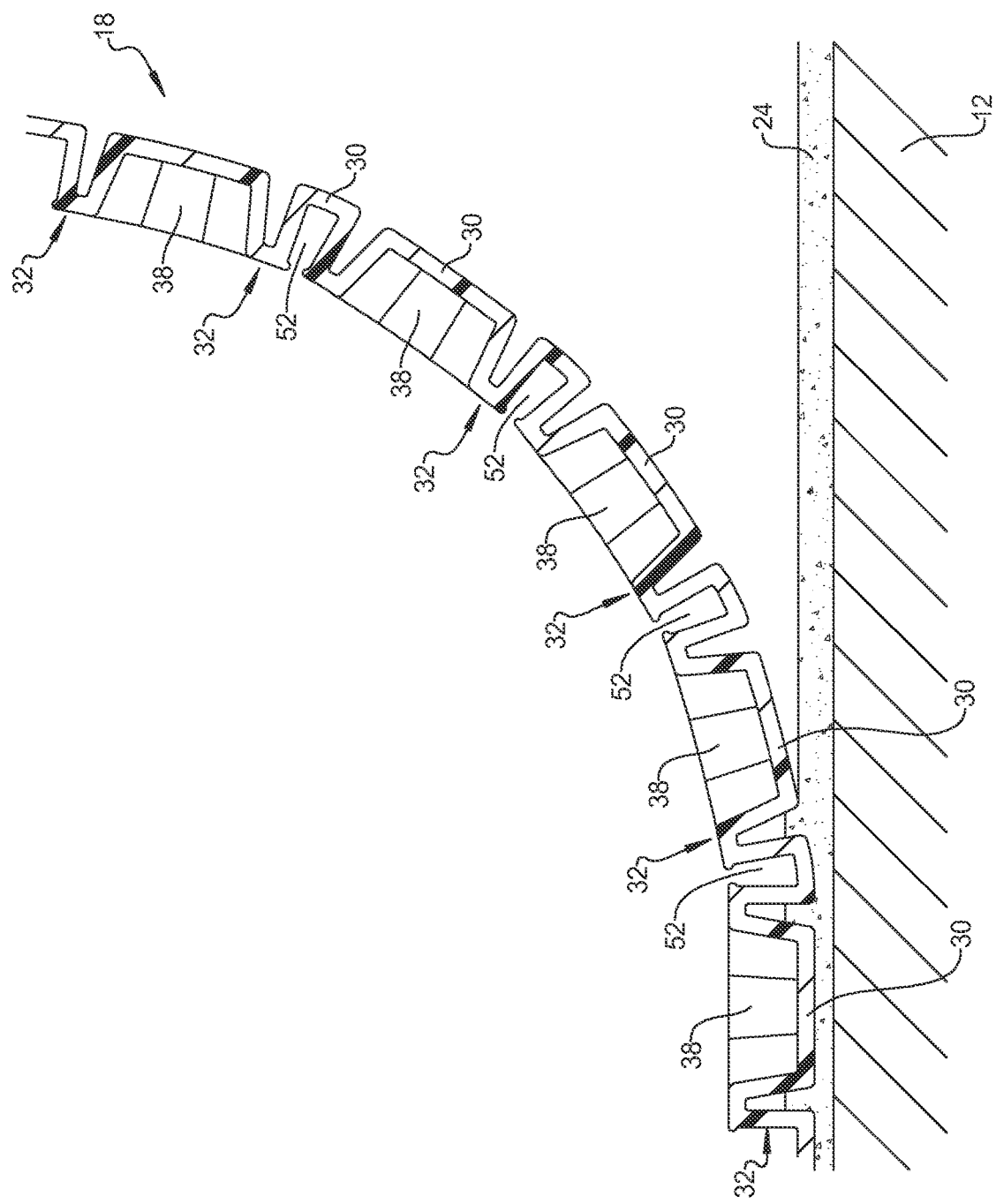
FIG. 11 is a section view illustrating the base membrane being applied to a subfloor using thinset.
Figure 12:
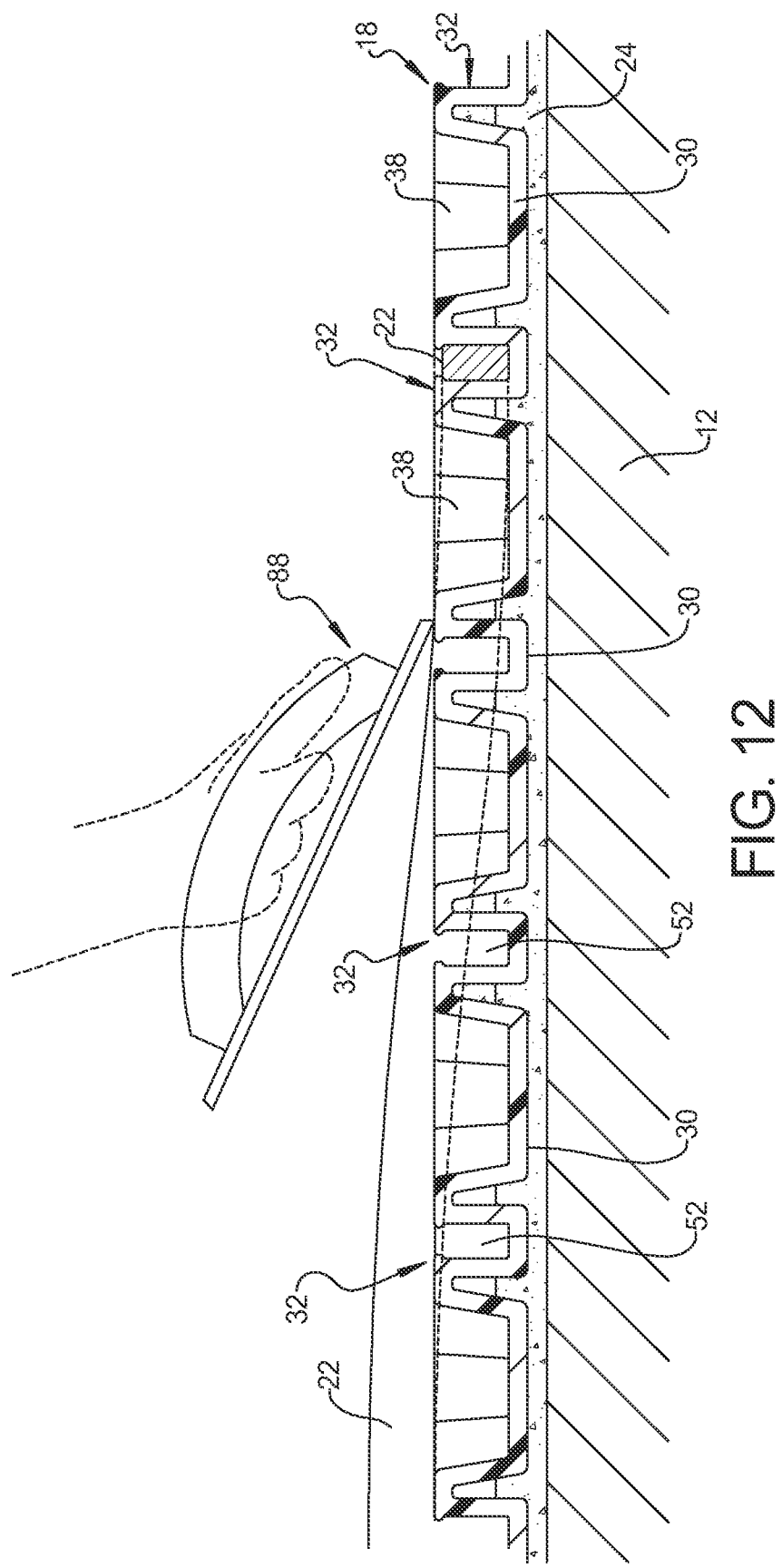
FIG. 12 is a section view illustrating the heating cable being embedded between suds on the base membrane at locations along a desired routing pattern.

Referring now to FIGS. 11-14, a method of installing the floor heating system 10 (or the flooring underlayment 10) will now be described. First, the first layer 24 of thinset is applied to the subfloor 12, and the base membrane 18 is placed onto the subfloor 12 over the first layer 24 of thinset as shown in FIG. 11. Instead of or in addition to using thinset, the base membrane 18 may be secured to the subfloor using fasteners (e.g., screws) and/or adhesive (e.g., peel-and-stick adhesive). Then, if the flooring heating system 10 includes the heating cable 22, the heating cable 22 is positioned at locations between the studs 32 on the base membrane 18 along a desired routing pattern of the heating cable 22 as shown in FIG. 12. The heating cable 22 may be embedded between the studs 32 on the base membrane 18 using a trowel 88.

Figure 13:
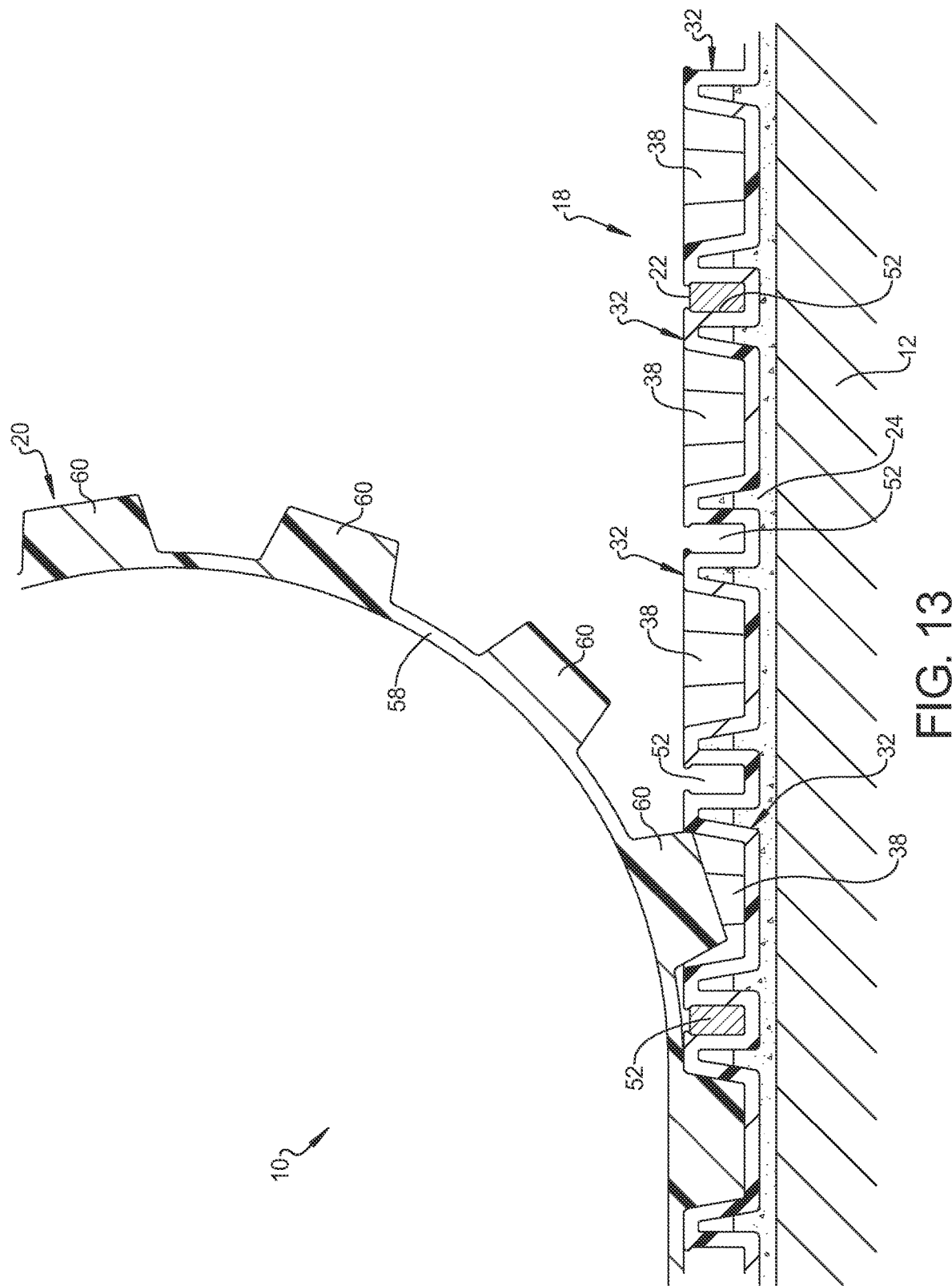
FIG. 13 is a section view illustrating the cover membrane being assembled to the base membrane to encapsulate the heating cable and to form a flat top surface.
Figure 14:
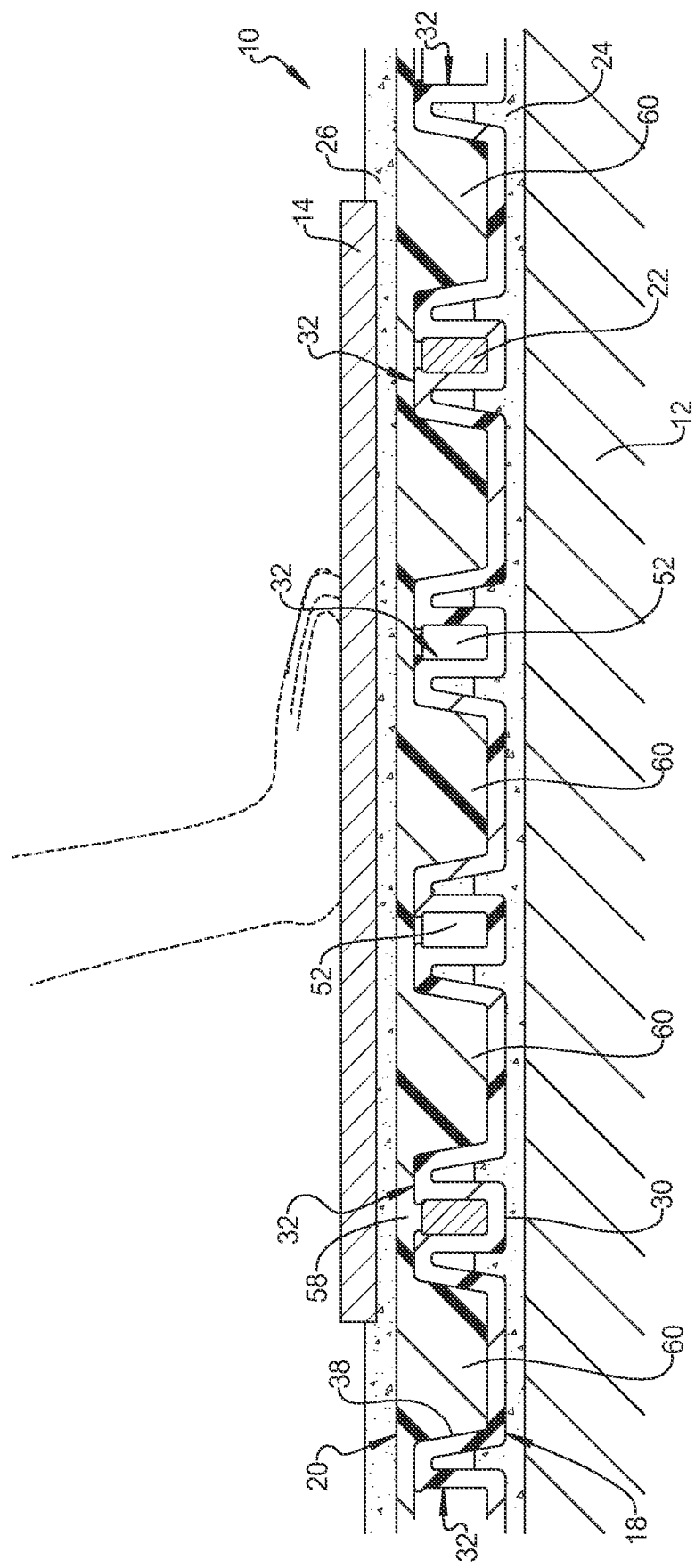
FIG. 14 is a section view illustrating the use of thinset to install tile onto the flat top surface formed by the cover membrane.

Then, the cover membrane 20 is coupled to the base membrane 18 by inserting the studs 60 on the cover membrane 20 into the pockets 38 in the base membrane 18 as shown in FIG. 13. In turn, the cover membrane 20 forms the flat top surface 56 on which the floor tiles 14 are installed, and the heating cable 22 (if included) is encapsulated between the base and cover membranes 18 and 20. The studs 60 may be secured within the pockets 38 using a snap fit as discussed above. Finally, the second layer 26 of thinset is applied to the flat top surface 56 formed by the cover membrane 20, and the floor tiles 14 are installed on the flat top surface 56 over the second layer 26 of thinset as shown in FIG. 14. Since the cover membrane 20 is used in place of thinset to encapsulate the heating cable 22 and/or to form the flat top surface 56, the floor tiles 14 are installed without applying thinset directly to the base membrane 18.

The second layer 26 of thinset may be troweled (i.e., leveled using the trowel 88) before the floor tiles 14 are placed on the second layer 26 of thinset. The second layer 26 of thinset may be allowed to cure (i.e., harden) for 24 hours after the floor tiles 14 are placed on the second layer 26 of thinset. Once the second layer 26 of thinset is cured, the spaces between the floor tiles 14 may be filled with grout to form the joints 16 between the floor tiles 14. Then, a final clean may be performed to remove excess material (e.g., excess grout) on the tile floor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe spatial and functional relationships between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A flooring underlayment comprising:
   a base membrane configured to be installed between a subfloor and floor tiles to allow movement of the floor tiles relative to the subfloor, the base membrane including a base layer and a plurality of studs projecting from the base layer, the plurality of studs having free ends that define pockets therein; and
   a cover membrane configured to be coupled to the base membrane to form a flat surface for supporting the floor tiles, the cover membrane including a cover layer and a plurality of studs projecting from the cover layer, wherein the plurality of studs on the cover membrane are configured to fit within the pockets in the plurality of studs on the base membrane to couple the cover membrane to the base membrane.

2. The flooring underlayment of claim 1 wherein the plurality of studs on the cover membrane are configured to be secured within the pockets in the plurality of studs on the base membrane using a snap fit.

3. The flooring underlayment of claim 1 wherein the base membrane and the cover membrane are made of at least one of a plastic and a rubber.

4. The flooring underlayment of claim 1 wherein each stud in the plurality of studs on the base membrane has an outer side surface and a top surface, and each pocket in the plurality of studs has an inner side surface and a bottom surface, the inner side surface tapering outward from the bottom surface to the top surface.

5. The flooring underlayment of claim 4 wherein each stud in the plurality of studs on the cover layer has an outer side surface and a bottom surface, the outer side surface of each stud in the plurality of studs on the cover layer tapering inward from the cover layer to the bottom surface of the corresponding stud on the cover layer.

6. The flooring underlayment of claim 5 wherein the inner side surface of each pocket in the plurality of studs on the base membrane tapers outward at a first angle, and the outer side surface on each stud in the plurality of studs on the cover membrane tapers inward at a second angle that is equal to the first angle.

7. The flooring underlayment of claim 1 wherein each stud in the plurality of studs on the base membrane has an outer perimeter with a polygonal shape having N sides, N being an integer greater than one.

8. The flooring underlayment of claim 1 wherein each pocket in the plurality of studs on the base membrane has an inner perimeter with a first polygonal shape having N sides, N being an integer greater than one.

9. The flooring underlayment of claim 8 wherein each stud in the plurality of studs on the cover membrane has an outer perimeter with a second polygonal shape having P sides, P being equal to N.

10. The flooring underlayment of claim 1 wherein each pocket in the plurality of studs on the base membrane has a tapered inner surface, and each stud in the plurality of studs on the cover membrane has a tapered outer surface that matches the tapered inner surface.

11. The flooring underlayment of claim 1 wherein each pocket in the plurality of studs on the base membrane have an inner perimeter with a first polygonal shape, and each stud in the plurality of studs on the cover membrane have an outer perimeter with a second polygonal shape that matches the first polygonal shape.

12. A floor structure comprising:
    a subfloor;
    floor tiles;
    a base membrane configured to be installed between the subfloor and the floor tiles to allow movement of the floor tiles relative to the subfloor, the base membrane including a base layer and a plurality of studs projecting from the base layer, the plurality of studs having free ends that define pockets therein; and
    a cover membrane configured to be coupled to the base membrane to form a flat surface for supporting the floor tiles, the cover membrane including a cover layer and a plurality of studs projecting from the cover layer, wherein the plurality of studs on the cover membrane are configured to fit within the pockets in the plurality of studs on the base membrane to couple the cover membrane to the base membrane.

13. The floor structure of claim 12 wherein each pocket in the plurality of studs on the base membrane has a tapered inner surface, and each stud in the plurality of studs on the cover membrane has a tapered outer surface that matches the tapered inner surface.

14. The floor structure of claim 12 wherein each pocket in the plurality of studs on the base membrane have an inner perimeter with a first polygonal shape, and each stud in the plurality of studs on the cover membrane have an outer perimeter with a second polygonal shape that matches the first polygonal shape.

15. The floor structure of claim 12 wherein the floor structure is free of any heating cable.

16. A method of installing a floor structure, the method comprising:
    placing a base membrane onto a subfloor, the base membrane including a base layer and a plurality of studs projecting from the base layer, the plurality of studs defining a plurality of pockets therein;
    coupling a cover membrane to the base membrane by inserting a plurality of studs on the cover membrane into the plurality of pockets in the base membrane to form a flat top surface; and
    installing floor tiles on the flat top surface formed by the cover membrane.

17. The method of claim 16 further comprising securing the plurality of studs on the cover membrane within the plurality of pockets in the base membrane using a snap fit.

18. The method of claim 16 further comprising applying a first layer of thinset between the subfloor and the base membrane.

19. The method of claim 18 further comprising applying a second layer of thinset between the cover membrane and the floor tiles.

20. The method of claim 16 further comprising installing the floor tiles without applying thinset directly to the base membrane.

21. The method of claim 16 further comprising coupling the cover membrane to the base membrane without positioning a heating cable between the cover and base membranes.

* * * * *